(12) United States Patent
Richard et al.

(10) Patent No.: US 6,568,857 B1
(45) Date of Patent: May 27, 2003

(54) THRUST BEARING ASSEMBLY

(75) Inventors: Eric R. Richard, Torrington, CT (US); David R. Moulton, Barkhamsted, CT (US)

(73) Assignee: The Torrington Company, Torrington, CT (US)

( * ) Notice: Subject to any disclaimer, the term of this patent is extended or adjusted under 35 U.S.C. 154(b) by 8 days.

(21) Appl. No.: 10/007,626

(22) Filed: Nov. 8, 2001

(51) Int. Cl.[7] ............................................... F16C 19/30
(52) U.S. Cl. ...................................... 384/470; 384/606
(58) Field of Search ............................... 384/470, 606, 384/614, 623

(56) References Cited

U.S. PATENT DOCUMENTS

| | | |
|---|---|---|
| 1,913,275 A | 6/1933 | Herrmann |
| 2,718,440 A | 9/1955 | Brinkmann |
| 3,414,342 A | 12/1968 | Root |
| 4,968,157 A | 11/1990 | Chiba ........................ 384/462 |
| 5,356,227 A | 10/1994 | Sibley et al. ............... 384/463 |
| 5,529,401 A | 6/1996 | Gabelli et al. ............. 384/470 |
| 5,630,670 A | 5/1997 | Griffen et al. ............. 384/606 |
| 5,927,868 A | 7/1999 | Critchley et al. .......... 384/606 |
| 6,102,580 A | 8/2000 | Alling et al. .............. 384/618 |

FOREIGN PATENT DOCUMENTS

GB        1175109     * 12/1969   ................. 384/623

* cited by examiner

*Primary Examiner*—Thomas R. Hannon
(74) *Attorney, Agent, or Firm*—Michael Best & Friedrich LLP

(57) ABSTRACT

A bearing assembly includes a first race with an axially extending section and a radially extending section, a second race with an axially extending section and a radially extending section, a cage supported between the first and second races, and a plurality of rolling elements circumferentially spaced within openings formed in the cage. A radial lubrication passage with an inlet and an outlet extends through at least a portion of the cage. The radially extending section of the first race and the axially extending section of the second race define a first annular gap. The radially extending section of the second race and the axially extending section of the first race define a second annular gap. Preferably, the inlet is in fluid communication with the first annular gap and the outlet extends axially through the cage and is aligned with the second annular gap.

22 Claims, 2 Drawing Sheets

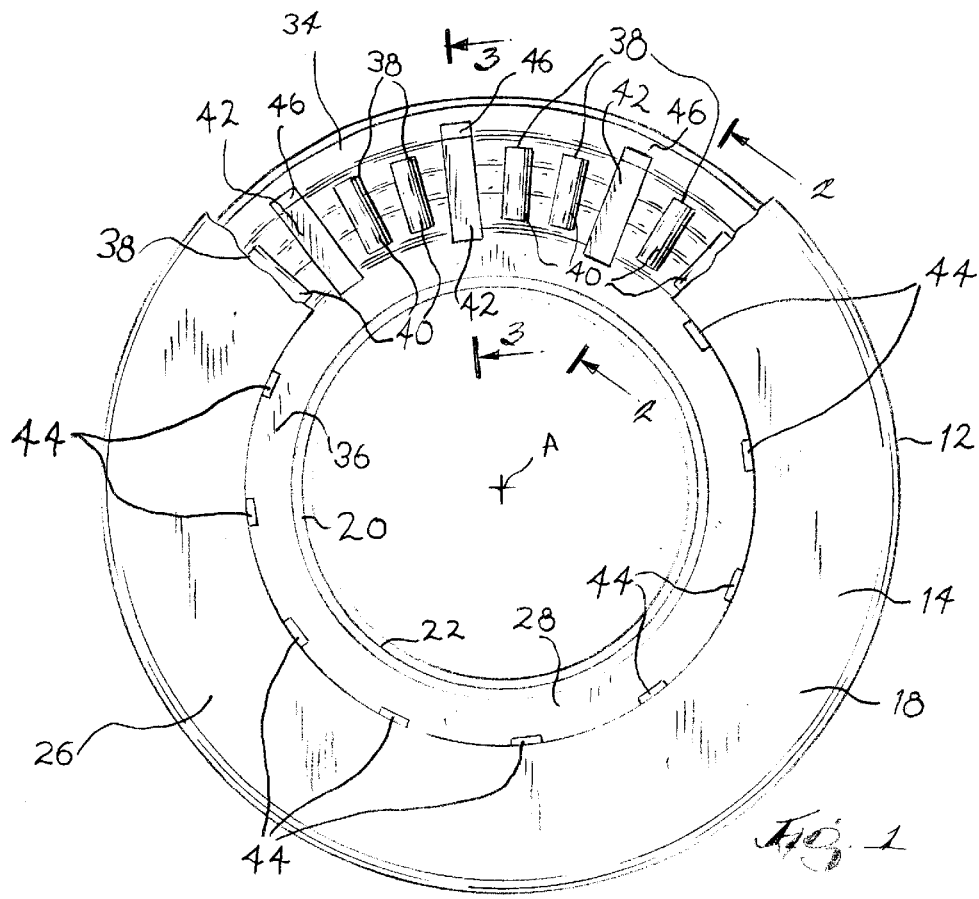
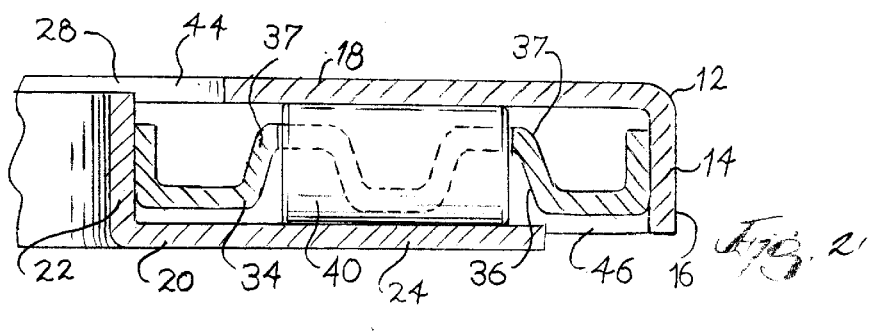
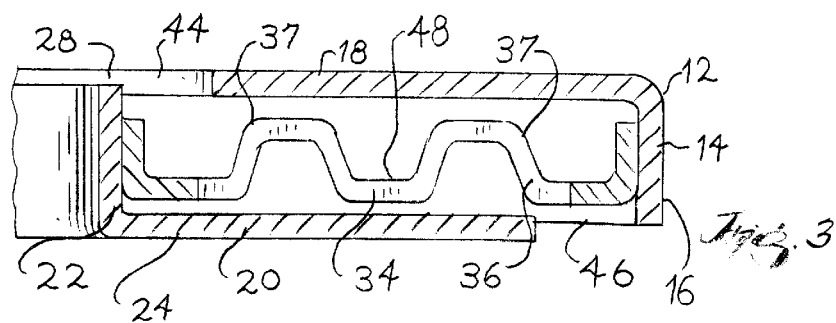

THRUST BEARING ASSEMBLY

FIELD OF THE INVENTION

The present invention relates generally to thrust bearing assemblies and, more particularly, to a thrust bearing assembly including lubricant flow passages.

BACKGROUND OF THE INVENTION

A typical thrust bearing assembly includes a pair of races, a bearing retainer or cage positioned between the races and defining a plurality of circumferentially-spaced openings, and one or more rolling elements positioned in at least some of the openings. One type of bearing cage is a Sigma-type cage, in which the bearing cage has a Sigma-shaped configuration, as viewed in longitudinal section. The bearing assembly is generally used between two relatively-moving structures of an apparatus, such as, for example, a torque converter.

Lubricant is typically provided to the bearing assembly to lubricate the components of the bearing assembly. Lubricant may also be provided through the bearing assembly to lubricate the additional structures of the apparatus which are downstream of the bearing assembly.

SUMMARY OF THE INVENTION

One independent problem with existing thrust bearing assemblies is that the bearing assemblies restrict the flow of lubricant to the additional downstream structures in the apparatus. The bearing assembly is a "choke-point" of lubricant flow in the apparatus.

The present invention provides a bearing assembly which substantially alleviates one or more of the above-identified and other problems with existing bearing assemblies, The bearing assembly includes a bearing retainer or cage defining one or more lubricant flow passages which improve the flow of lubricant to the components of the bearing assembly and through the bearing assembly. In one aspect, the cage defines a lubricant outlet which is axially aligned with the radially-outer, downstream annular gap defined by the races. In another aspect, the cage defines a passage having a lubricant inlet axially aligned with the radially-inner, upstream annular gap defined by the races, a lubricant outlet which is axially aligned with the radially-outer, downstream annular gap defined by the races, and an internal radial passage radially aligned with and communicating between the inlet and the outlet.

More particularly, the invention provides a bearing assembly including a first race having an axially extending section and a radially extending section, a second race having an axially extending section and a radially extending section, the axially extending section of the first race being substantially plane parallel with the axially extending section of the second race, the radially extending section of the first race being substantially plane parallel with the radially extending section of the second race, the radially extending section of the first race and the axially extending section of the second race defining a first annular gap, the radially extending section of the second race and the axially extending section of the first race defining a second annular gap, a cage supported between the first race and the second race, the cage having a body defining a plurality of circumferentially spaced openings, the body defining an inlet passage and an outlet passage in fluid communication with the inlet passage, the outlet passage extending axially through the cage body and being axially aligned with the second annular gap, and a plurality of rolling elements, ones of the plurality of rolling elements being positioned within a selected ones of the plurality of openings.

Preferably, the inlet passage is in fluid communication with at least one of the plurality of openings, and the outlet passage is in fluid communication with at least one of the openings. In some constructions, the body is preferably of a Sigma-shaped configuration, as viewed in longitudinal section.

The body may form a substantially circular channel, the channel in fluid communication with the plurality of openings, the inlet passage, and the outlet passage. Further, the body may form a substantially circular second channel, the second channel in fluid communication with the plurality of openings, the inlet passage, and the outlet passage.

Preferably, the inlet passage is axially aligned with the first annular gap. The body preferably defines an internal radial passage fluidly connecting the inlet passage and the outlet passage, the radial passage being radially aligned with the inlet passage and the outlet passage. Preferably, the radial passage extends radially through the body a first radial distance, the plurality of openings each extend radially through the body a second radial distance, and the first radial distance is greater than the second radial distance. The body may define a plurality of inlet passages, and a plurality of outlet passages each extending axially through the cage body and each axially aligned with the second annular gap.

Also, the present invention provides a bearing assembly including a first race having an axially extending section and a radially extending section, a second race having an axially extending section and a radially extending section, the axially extending section of the first race substantially plane parallel with the axially extending section of the second race, the radially extending section of the first race substantially plane parallel with the radially extending section of the second race, the radially extending section of the first race and the axially extending section of the second race defining a first annular gap, the radially extending section of the second race and the axially extending section of the first race defining a second annular gap, a cage supported between the first race and the second race, the cage having a body defining a plurality of circumferentially spaced openings, the body defining a radial passage having an inlet and an outlet, the inlet being in fluid communication with the first annular gap, the outlet extending axially through the cage body and being axially aligned with the second annular gap, and a plurality of rolling elements, ones of the plurality of rolling elements being positioned within selected ones of the plurality of openings.

In addition, the present invention provides a cage for a bearing assembly, the cage including a body defining a plurality of circumferentially spaced openings, each opening having a first radial length, at least one of the plurality of openings accommodating a rolling element, and a radial passage having an inlet and an outlet, the outlet extending axially through the body, the radial passage having a second radial length, the second radial length being greater than the first radial length.

One independent advantage of the bearing assembly of the present invention is that there is improved lubricant flow through the bearing assembly. The radial lubricant passage allows improved flow through the bearing assembly.

Other independent features and independent advantages of the invention will become apparent to those skilled in the art upon review of the following detailed description, claims, and drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 1 is top view of the bearing assembly with a cut-away section;

FIG. 2 is a cross-sectional view of the bearing assembly shown in FIG. 1 taken along line 2—2;

FIG. 3 is a cross-sectional view of the bearing assembly shown in FIG. 1 taken along line 3—3;

DETAILED DESCRIPTION OF THE PREFERRED EMBODIMENT

A bearing assembly 12 embodying the invention is illustrated in FIG. 1. The bearing assembly 12 includes a first race 14 having an axially extending section 16 and a radially extending section 18. The first race 14 has a substantially L-shaped configuration when viewed in cross section (as shown FIGS. 2–3 and 5).

Figure 4:
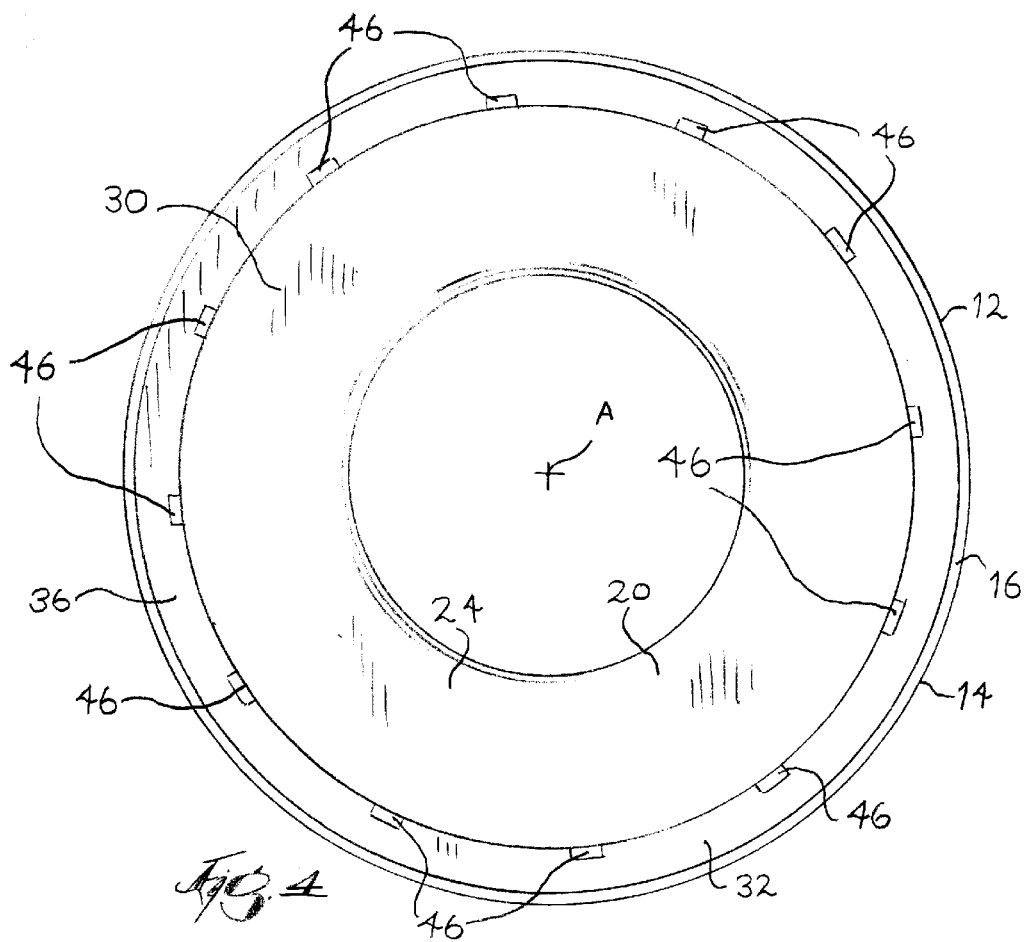
FIG. 4 is a bottom view of the bearing assembly shown in FIG. 1.

A second race 20 (see FIG. 4), also having a substantially L-shaped configuration with an axially extending section 22 and a radially extending section 24, is positioned adjacent the first race 14. The axially extending section 16 of the first race 14 is substantially plane parallel with the axially extending section 22 of the second race 20. Similarly, the radially extending section 18 of the first race 14 is substantially plane parallel with the radially extending section 24 of the second race 20. In this manner, the bearing assembly 12 is relatively enclosed by the races 14 and 20. The races 14 and 20 may include interlocking structure so that the bearing assembly forms a unit. However, in other constructions (not shown), the races 14 and 20 do not include interlocking structure, and such a bearing assembly may be assembled and disassembled.

As shown in FIG. 1, the bearing assembly 12 has a first face 26. A first annular gap 28 extends circumferentially around the first face 26. The first annular gap 28 is defined by the axially extending section 22 of the second race 20 and by the radially extending section 18 of the first race 14. Similarly, the bearing assembly 12 has (see FIG. 4) a second face 30. A second annular gap 32 extends circumferentially around the second face 30. The second annular gap 32 is defined by the axially extending section 16 of the first race 14 and by the radially extending section 24 of the second race 20.

Figure 5:
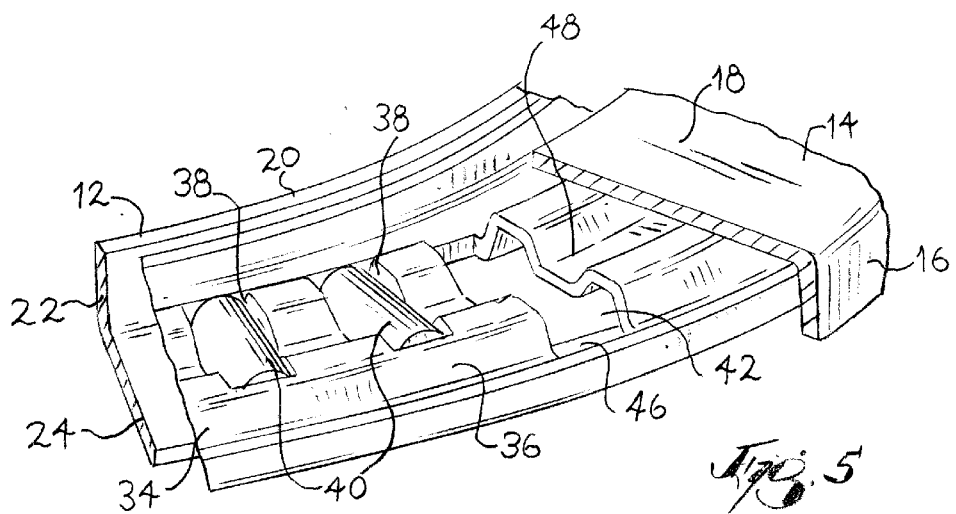
FIG. 5 is a cut-away perspective view of the bearing assembly shown in FIG. 1.

As shown in FIGS. 1–3 and 5, the bearing assembly 12 also includes a bearing retainer or cage 34. The cage 34 has body 36 and is positioned between and supported by the races 14 and 20. The body 36 has a substantially circular configuration and extends circumferentially about the axis A of the bearing assembly 12. The body 36 is substantially surrounded by the races 14 and 20 and is formed so that the body 36 has a number of axially spaced surfaces 37. When viewed in longitudinal section, (as best seen in FIGS. 2, 3, and 5) the body 36 has a substantially Sigma shape.

A plurality of openings 38 extend into or through the body 36. The openings 38 are circumferentially spaced about the body 36. Each of the openings 38 is adapted to receive a rolling element 40. The rolling elements 40 may be rollers, balls, wheels, or other similar friction reducing elements. In the illustrated construction, the rolling elements 40 are cylindrically-shaped roller bearing elements.

As shown in FIGS. 1, 3 and 5, a passage 42 extends radially through a portion of the body 36. FIG. 1 shows a number of passages 42 spaced circumferentially around the body 36 and interspersed between the openings 38. Preferably, each passage 42 extends a greater radial distance through the bearing assembly 12 than the openings 38. Each passage 42 includes an inlet 44 and an outlet 46. Each inlet 44 extends axially through the body 36. Preferably, each inlet 44 is in fluid communication and axially aligned with the first annular gap 28. Each outlet 46 extends axially through the body 36. Preferably, each outlet 46 is in fluid communication and axially aligned with the second annular gap 32.

The body 36 also defines at least one and, preferably, two circular channels 48. The channels 48 extend circumferentially around the body 36 and are in fluid communication with the openings 38 and with the passages 42.

In operation, the bearing assembly 12 is used in an apparatus (not shown), such as, for example, a torque converter. The bearing assembly 12 is positioned between two relatively moving structures (not shown) of the apparatus.

Lubricant is supplied to the bearing assembly 12 to lubricate the components of the bearing assembly 12. Lubricant is also supplied through the bearing assembly 12 to lubricate the structures of the apparatus which are downstream of the bearing assembly 12.

Lubricant flows into the bearing assembly 12 through the inlets 44. The lubricant flows through the channels 48 to each opening 38. In this manner, the components of the bearing assembly 12 are lubricated.

Lubricant also flows radially through the bearing assembly 12 through the passages 42. The lubricant flows out of the bearing assembly 12 to the downstream structures through the outlets 46. Because the outlets 46 are axially aligned with the second, downstream annular gap 32, the lubricant flows more freely from the bearing assembly 12. The radial passages 42 also improve flow of lubricant through the bearing assembly 12.

Although the invention has been described in detail with reference to certain preferred embodiments, variations and modifications exist within the scope and spirit of the invention as described in the following claims.

What is claimed is:

1. A bearing assembly comprising:
   a first race having an axially extending section and a radially extending section;
   a second race having an axially extending section and a radially extending section, the axially extending section of the first race being substantially plane parallel with the axially extending section of the second race, the radially extending section of the first race being substantially plane parallel with the radially extending section of the second race, the radially extending section of the first race and the axially extending section of the second race defining a first annular gap, the radially extending section of the second race and the axially extending section of the first race defining a second annular gap;

a cage supported between the first race and the second race, the cage having a body defining a plurality of circumferentially spaced openings, the body defining an inlet passage and an outlet passage in fluid communication with the inlet passage, the outlet passage extending axially through the cage body and being axially aligned with the second annular gap; and a plurality of rolling elements, ones of the plurality of rolling elements being positioned within a selected ones of the plurality of openings.

2. The bearing assembly as claimed in claim 1, wherein the inlet passage is in fluid communication with at least one of the plurality of openings, and wherein the outlet passage is in fluid communication with at least one of the openings.

3. The bearing assembly as claimed in claim 1, wherein the body is of a Sigma-shaped configuration, as viewed in longitudinal section.

4. The bearing assembly as claimed in claim 1, wherein the body forms a substantially circular channel, the channel being in fluid communication with the plurality of openings, the inlet passage, and the outlet passage.

5. The bearing assembly as claimed in claim 4, wherein the body forms a substantially circular second channel, the second channel being in fluid communication with the plurality of openings, the inlet passage, and the outlet passage.

6. The bearing assembly as claimed in claim 1, wherein the inlet passage is axially aligned with the first annular gap.

7. The bearing assembly as claimed in claim 1, wherein the body defines an internal radial passage fluidly connecting the inlet passage and the outlet passage, the radial passage being radially aligned with the inlet passage and the outlet passage.

8. The bearing assembly as claimed in claim 7, wherein the radial passage extends radially through the body a first radial distance, wherein the plurality of openings each extend radially through the body a second radial distance, and wherein the first radial distance is greater than the second radial distance.

9. The bearing assembly as claimed in claim 1, wherein the body defines a plurality of inlet passages, and wherein the body defines a plurality of outlet passages each extending axially through the cage body and each axially aligned with the second annular gap.

10. A bearing assembly comprising:
a first race having an axially extending section and a radially extending section;
a second race having an axially extending section and a radially extending section, the axially extending section of the first race substantially plane parallel with the axially extending section of the second race, the radially extending section of the first race substantially plane parallel with the radially extending section of the second race, the radially extending section of the first race and the axially extending section of the second race defining a first annular gap, the radially extending section of the second race and the axially extending section of the first race defining a second annular gap;
a cage supported between the first race and the second race, the cage having a body defining a plurality of circumferentially spaced openings, the body defining a radial passage having an inlet and an outlet, the inlet being in fluid communication with the first annular gap, the outlet extending axially through the cage body and being axially aligned with the second annular gap; and
a plurality of rolling elements, ones of the plurality of rolling elements being positioned within selected ones of the plurality of openings.

11. The bearing assembly as claimed in claim 10, wherein the body is of a Sigma-shaped configuration, as viewed in longitudinal section.

12. The bearing assembly as claimed in claim 10, wherein the body forms a substantially circular channel, the channel being in fluid communication with the plurality of openings and with the radial passage.

13. The bearing assembly as claimed in claim 12, wherein the body forms a substantially circular second channel, the second channel being in fluid communication with the openings and with the radial passage.

14. The bearing assembly as claimed in claim 10, wherein the inlet is axially aligned with the first annular gap.

15. The bearing assembly as claimed in claim 10, wherein the passage extends radially through the body a first radial distance, wherein the plurality of openings each extend radially through the body a second radial distance, and wherein the first radial distance is greater than the second radial distance.

16. The bearing assembly as claimed in claim 10, wherein the body defines a second radial passage having a second inlet and a second outlet, the second radial passage being circumferentially spaced from the first-mentioned passage, the second inlet being in fluid communication with the first annular gap, the second outlet extending axially through the body and being axially aligned with the second annular gap.

17. A cage for a bearing assembly, the cage comprising:
a body defining
a plurality of circumferentially spaced openings, each opening having a first radial length, at least one of the plurality of openings accommodating a rolling element, and
a radial passage having an inlet and an outlet, the outlet extending axially through the body, the radial passage having a second radial length, the second radial length being greater than the first radial length.

18. The cage as claimed in claim 17, wherein the body forms a substantially circular channel, the channel being in fluid communication with at least one of the plurality of openings and with the passage.

19. The cage as claimed in claim 18, wherein the body forms a substantially circular second channel, the second channel being in fluid communication with the plurality of openings and with the passage.

20. The cage as claimed in claim 17, wherein the body defines a second internal radial passage having a second inlet and a second outlet, the second radial passage being circumferentially spaced from the first-mentioned passage.

21. The cage as claimed in claim 17 wherein the body defines a plurality of radial passages each having an inlet and an outlet, each outlet extending axially through the body, each of the plurality of radial passages having a second radial length, and wherein the plurality of openings and the plurality of radial passages are alternatingly spaced circumferentially around the body.

22. The cage as claimed in claim 17, wherein the body is of a Sigma-shaped configuration, as viewed in longitudinal section.

* * * * *